United States Patent
Guzauskas

(10) Patent No.: US 7,723,421 B2
(45) Date of Patent: *May 25, 2010

(54) MOLDING COMPOSITIONS WITH SOLID THERMOPLASTIC ELASTOMER THICKENERS AND PRODUCTS OBTAINED THEREFROM

(75) Inventor: Robert Guzauskas, 4047 Okeechobee Blvd., Suite 215, West Palm Beach, FL (US) 33409

(73) Assignee: Robert Guzauskas, West Palm Beach, FL (US)

(*) Notice: Subject to any disclaimer, the term of this patent is extended or adjusted under 35 U.S.C. 154(b) by 570 days.

This patent is subject to a terminal disclaimer.

(21) Appl. No.: 11/593,136

(22) Filed: Nov. 6, 2006

(65) Prior Publication Data

US 2007/0249774 A1  Oct. 25, 2007

(51) Int. Cl.
*C08K 3/06* (2006.01)

(52) U.S. Cl. ........................ 524/439; 524/494; 524/495

(58) Field of Classification Search ................ 524/494, 524/495, 439

See application file for complete search history.

(56) References Cited

U.S. PATENT DOCUMENTS

| 6,103,779 | A | 8/2000 | Guzauskas | |
| 7,132,469 | B2 * | 11/2006 | Guzauskas | 524/492 |

* cited by examiner

*Primary Examiner*—Edward J Cain
(74) *Attorney, Agent, or Firm*—Whyte Hirschboeck Dudek S.C.

(57) ABSTRACT

A method of preparing thickened compositions which can be molded under low pressures and temperatures to provide thermoset articles, wherein liquid reactive components are slowly absorbed in solid thermoplastic elastomer thickeners such as thermoplastic ionomers and acrylic block copolymers. The thickener delays the viscosity build, allowing fiber reinforcement and other fillers to be incorporated, if desired, before molding. The molding composition is well suited for use in dentistry and other fields where small amounts or molding composition are used occasionally.

20 Claims, No Drawings

US 7,723,421 B2

MOLDING COMPOSITIONS WITH SOLID THERMOPLASTIC ELASTOMER THICKENERS AND PRODUCTS OBTAINED THEREFROM

This application claims the benefit of the filing date of U.S. Provisional Application Ser. No. 60/391,925 filed Jun. 28, 2002.

FIELD OF THE INVENTION

This invention relates to the preparation of thermosetting molding compositions using a solid thermoplastic elastomer thickener with secondary bonding.

SUMMARY OF THE INVENTION

The chemical and physical structure of the thermoplastic elastomer thickener is a tool for modifying and controlling the thickening process, the blending of ingredients into a thermosetting molding composition and the properties of the fully cured organic polymer composition. The chemical and physical nature of the thermosetting molding composition permits fiber reinforcement and other additives to be easily incorporated therein.

These thermosetting molding compositions can be dispensed as premixed doughs (bulk molding compounds), thick molding compounds or sheets (sheet molding compounds) and can be molded using low shear pressure molding techniques and conditions of temperature and pressure to form articles ranging from automotive parts to dental appliances to bathroom shower stalls. These solid thermoplastic elastomer thickeners allow for an extended shelf life in the uncured doughs.

The solid thermoplastic elastomer thickeners employed herein share the common feature of having reversible cross-links between polymer chains. This cross linkage is secondary bonding. Ionic bonds link segments of polymer chains in ionomers. Hydrogen bonds, Van der Waals forces, physical chain entanglement and crystal lattice interaction can also link segments of the polymer backbone of acrylic block copolymers. The effects of secondary bonding on plastic properties are similar to covalent cross-linking but not to the same extent. For example, secondary bonding generally increases the melting temperature and decreases the solubility. In addition, secondary bonding usually increases the stiffness, strength and creep resistance of a plastic.

The suitable solid thermoplastic elastomer thickeners include thermoplastic ionomers such as "acrylic" containing ionomers, and, "acrylic" containing block copolymers. Particle sizes may be as small as a few microns (2 microns). The preferred particle size for the solid thermoplastic elastomer thickeners is determined by the delayed solubility of the solid thermoplastic elastomer thickener in the liquid of the composition. These solid thermoplastic elastomer thickeners may function effectively in concentrations as low as one (1) percent. The effective concentration of the solid thermoplastic elastomer thickener is determined by the resin demand of the other solid ingredients in the mix. The solid thermoplastic elastomer thickener is co-soluble in the liquid(s) of the composition whether these liquids are curable or not. For example, a some common solvent like acetone may be removed (evaporated) to convert the wet composition to a moldable dough. The objective is to maintain some time delay between the mixing of the solid and liquid ingredients of the molding composite and the initiation of the thickening process. Optional ingredients include long fiber reinforcement and additional thickeners such as alkaline earth oxides and/or hydroxides.

Acrylic resins are well known and include polymer and copolymer formulations whose major monomeric components belong to two families of esters: acrylates and methacrylates. The use of these polymers to form composite matrices is described in the following patents issued to Robert Guzauskas the inventor herein, U.S. Pat. Nos. 5,747,533, 6,103,779 and 6,433,037. These patents are assigned to the same assignee as the present invention. This invention takes that concept further to solid thermoplastic elastomer thickeners with secondary bonding. The solid thermoplastic elastomer thickeners described herein offer additional control of the properties and compatibilities of the molding compositions.

Two general classes of solid thermoplastic elastomer thickeners with secondary bonding are thermoplastic ionomers and acrylic block copolymers. Preferred ionomers incorporate acrylic moieties.

In general the properties of the linear, random and alternating copolymers described in U.S. Pat. Nos. 5,747,553, 6,103,779 and 6,433,037 are averages of the properties of the two or more homopolymers. With block copolymers, the properties are not averages but a distinct property profile.

An ionomer has covalent bonds within the polymer chain and ionic bonds between the chains (Harcourt Dictionary of Science and Technology). Dupont copolymerized ethylene and acrylics in the 1960's to produce ion-containing polymers. The product was named, "SURLYN", and the new ion containing copolymers were referred to as, "Ionomers". Ionomers are now made and sold by Dupont, A. Schulman, Network Polymers and Exxon. Commercially available ionomers include IOTEK®, ACLYN®, HIMIRAN®, COATTHYLENE® and ESCOR®.

Acrylic resins comprise a majority of both the ionomers and block copolymers that can be used as solid thermoplastic elastomer thickeners of this invention. Polyvinyl polymers such as polyvinyl acetate and polyvinyl alcohol are similar to acrylics with substitutions about the unsaturated bond linking two carbon atoms. These polymers can also be ionomers and when the terms "acrylic" block polymer or "acrylic" containing block copolymers are used herein, they include such polyvinyl polymers.

In the book "Introduction to Ionomers", Eisenberg and Kim define ionomers as polymers whose bulk properties are governed by ionic interactions in discrete regions of the material. They add that ionomers are defined by properties rather than by composition, and, that the crucial component of ionomers is the presence of electrically charged ionic groups along a polymer backbone. Ionomers have the common feature of containing ions (electrical charge centers) and neutralizing counter-ions. Ionomers are differentiated from polyelectrolytes only by degree. Polyelectrolytes are often quickly soluble in liquids. Ionomers (and block copolymers) are much less soluble. Ionomers generally, but not always, have ion contents below 15 to 20 mol percent. Whereas polyelectrolytes might have as many as one charged ion per "mer" unit. Typical ionomers are built upon hydrophobic, organic polymer backbones. Charged pendant groups are usually attached to the backbone. When ions are located within the polymer backbone that arrangement is sometimes called an ionene.

In the book, "Ionomers" the editors Tant, Mauritz & Wilkes, and authors Robert Jerome and Mieczyslaw Mazurek argue that there are just two kinds of polymers: Ionic polymers that already contain charged groups; and, Ionogenic polymers that are capable of receiving ionic groups. These ionic groups may be randomly, or, regularly distributed along the polymer backbone. This distribution creates a polyanion (negatively charged), polycation (positively charged) or polyampholyte (neutral charge). The backbone of the ionomers used in this invention is preferably an acrylic polymer, or copolymer, or block polymer. These charges are neutralized in whole or in part by counter ions. Anionomers are the most commercially important. Polyampholytes (Zwitterionomers) include many of the urethanes. Cationomers are generally the least important group of ionomers.

The chemical structure of the solid thermoplastic elastomer thickener determines it's morphology and together, chemical structure, polymer morphology and counterions determine the physical properties of the solid thermoplastic elastomer thickeners. Some of the physical properties include solubility, glass transition temperature, crystallinity, plasticity, miscibility and the ability to blend into other ingredients (compatibilization). Monochelic, telechelic and block copolymer structures are simply variants on the ionomer theme and have been produced with free radical polymerization or ionic polymerizations.

Many common ionomers have acrylic copolymer back bones such as those linear, acrylic polymers described in U.S. Pat. Nos. 5,747,553, 6,103,779 and 6,433,037. This invention is a modification of the linear solid acrylic compositions and the methodology described in U.S. Pat. Nos. 5,747,553, 6,103,779 and 6,433,037. The acrylic thickeners described in U.S. Pat. Nos. 5,747,553, 6,103,779 and 6,433,037 can be formed into ionomers. The acrylic polymers described therein are, "monochelic" ionomer structures, i.e., there is a single ion at one end of the polymer. The term "ionomer" as used herein, refers to polymers having more than a single ion. Additional versatility is provided by variations of this "monochelic ionomer" structure in providing thickeners. An otherwise linear, solid "monochelic", ionomer backbone may be decorated along it's length with positively or negatively charged groups, or combinations thereof. Examples of anions are carboxylates, sulfonates, and phosphonates. The charged group associates with a counter ion such as Na+, Li+, Mg++, or Zn++ in the case of anions. Cationic polymers are also quite common in the ionomer literature. Pendant pyridine groups are the most common examples. Other cations include aliphatic or aromatic amines. Sulfonium and phosphonium ions have also been incorporated into polymeric systems as have ammonium and pyridinium. Many counter ions can be used with these charged polymers.

In addition to changing the charge associations with the ionomer, all of the usual techniques of polymer science can be used to modify and thus control the physical and chemical properties of these ionomers.

The mechanism of delayed solubility, essential to the thickening action of the otherwise linear polymer thickener, is altered by the chemical and physical nature of ionomers. This delayed solubility is altered by the structure of the polymer backbone, which may be linear or branched, and by the choice and the concentration of the neutralizing counter ions. These alterations are most probably due to changes in molecular morphology: the coiling of the polymer backbone and the aggregation and interaction of ionic domains. Glass transitions can illustrate the presence of secondary bonding forces of sufficient magnitude to alter the physical properties of an organic polymer, such as delayed solubility.

Acrylic ionomers are well known and are commercially available. The synthesis of such ionomers relies upon two general methods:

1) Polymerization of monomers with ionic groups, and
2) Chemical modification of susceptible (ionogenic) polymers.

The resulting ionomers may have randomly distributed ionic groups, or, regularly distributed ionic groups. Random ionomers may contain anions (anionomers), cations (cationomers) or both anions and cations (polyampholytes and Zwitterionomers). Free-radical polymerizations are typically initiated by azo compounds or peroxides. Iononic routes can also be used. Random anionomers commonly contain carboxylate, sulfonate or phosphonate groups that are typically neutralized with alkali, alkali earth, transition metals or organic cations. The major cationomers contain ammonium, sulphonium or phosphonium. Their counterions may include halides and organic anions.

That acrylic monomers can be polymerized in liquid suspensions using free radical initiators such as AIBN is well known. Such polymers have minimal molecular cross-linking, are thermoplastic and are more or less soluble in various low molecular weight liquids. Since these thermoplastic polymers are easily molded using injection-molding operations, they are available from commercial manufacturers. But linear thermoplastic polymers easily absorb surrounding liquids, including water, with resultant swelling and sometimes dissolution. So where absorbed liquids or thermoplasticity may be a problem, cross-linked, thermoset, acrylic polymers are preferable. Thermosetting resins are the plastic of choice in many industries since the cross-linked polymers resist penetration by many liquids and resist distortion by heat or mechanical stress. Ionomers have the general characteristics of thermoplastics but have an ionic cross-linking of the polymer back bone across the charged pendant groups.

Methyl-methacrylate, ethylacrylate and acrylic acid are common acrylic monomers. Acrylic monomers can polymerize by a free radical, addition reaction. Two commercially used initiators for free-radical polymerization of acrylics are the peroxide initiator: benzoyl peroxide (BPO) and the aliphatic azonitrile initiator: azobisisobutyronitrile (AIBN). Both BPO and AIBN will decompose into free-radical activators at ambient temperature.

Peroxide initiated polymerizations tend to be more vigorous which can induce polymer chain decomposition with subsequent cross-linking between chain fragments. Cross-linking produces three dimensional network polymers that are said to be thermoset. AIBN and other azonitrile initiators produce lower polymerization exotherms, little polymer chain decomposition, minimal cross linking and linear, thermoplastic acrylic resins. In addition, azo initiators irreversibly decompose when heated. Therefore, residual azo initiator, AIBN, can be eliminated from acrylic resin by the deliberate heating of the resin. The resulting, essentially linear polymers, with the very narrow molecular weight distribution are those preferred for ionomers. The thermoplastic polymer can be converted to an ionomer by melting and mixing in a suitable salt such as sodium or lithium carbonate, magnesium hydroxide or zinc oxide. Other direct and indirect syntheses are available.

The deliberate cross linking of the secondary bonding found in ionomers and block copolymers used herein provides delayed solubility, i.e., delayed thickening, so it may prove practical to reduce the size of the solid polymer beads to a finer powder, and, to reduce the molecular weight of the polymer backbone to facilitate solubility, miscibility and other physical and chemical properties as desired by a compounder skilled in the art.

There is a distinction between using alkaline earth materials as thickeners in chemically thickenable resins to produce a moldable dough (typically a Sheet Molding Compound), as opposed to the use of alkaline earth materials as simple fillers in resins which cannot be chemically thicken. The thermoplastic elastomer thickeners of this invention thickened by a physical process and can thicken resins which do not chemically thicken. The presence of CaO, Ca(OH), MgO, or Mg(OH) in the compositions with resins which do not chemically thicken function as simple fillers. Calcium carbonates, limestone and gypsum are some examples of compositions which can be simply fillers.

Although the acrylic doughs provide useful molded articles, the physical properties are not ideal for all applications and have been manipulated by blending methyl methacrylate with other resins, forming copolymers with the methyl methacrylate monomer and/or increasing the degree of cross-linking between polymer chains. Adding fiber reinforcement is desirable for some applications.

Long fibrous fillers, such as glass, carbon, aramid, etc., are known to greatly enhance strength, stiffness and toughness of plastic materials. Long fibers being defined as lengths equal to or exceeding the critical aspect ratio of the fiber matrix combination. Plastics reinforced with such long fibrous inclusions, i.e., composites, exhibit physical and chemical properties that are a composite of the properties of the fibrous fillers and plastic matrix. Typically, the included fiber has tensile strength much higher than the resin matrix, is insoluble in the resin matrix and is chemically, or physically bonded to the resin matrix in such a way as to deflect a crack propagating through the resin matrix along the length of the fiber-matrix interface. Fibers turn the crack, absorb the energy of fracture, reduce the incidence of through-and-through-fracture, and give composites their characteristic properties of high strength, high stiffness, toughness and lightweight. The properties of some conventional polymeric materials and composites are disclosed in *CRC Practical Handbook of Materials Science*, Ed. Charles T. Lynch, 1994, pp. 547-548 (vinyls, ASA resins), 327-328 (glass fiber, organic fiber) and 342 (organic matrix composites). While the use of long fibrous fillers can provide advantageous physical properties, fiber is difficult to incorporate into a resin matrix, particularly where the matrix resin is highly viscous.

Conventional thermosetting acrylic thickened doughs of powdered, low molecular weight acrylic resin and lightly inhibited acrylic monomer liquid are highly viscous. The mixture quickly passes from a wet slurry, to a viscous paste and then to a moldable dough as the resin particles first absorb and then dissolve in the monomer. Unfortunately, this otherwise convenient, rapid transition from slurry to paste to dough produces a very abrupt rise in viscosity. In addition, residual BPO initiator in the acrylic resin powder, intended to thermoset the mix, begins spontaneous decomposition, initiates polymerization and can reduce the shelf life of the fresh dough to only a few hours at 8° F.

Early efforts to bring a thermoset, fiber reinforced, organic polymer composite to the dental market have floundered on the two problems of 1) prematurely high viscosity; and 2) premature gelation (polymerization). Viscosity is intentionally built-up rapidly in dental acrylic as finely powdered, low molecular weight resins are dissolved in monomer to make moldable dough. Premature gelation is a consequence of the demand for low curing temperature. Adding reinforcing fibers to this increasingly viscous mix quickly becomes impractical. Adding long fibers to any liquid causes the liquid to become intractably thick, even at levels of only 2 wt. %. As disclosed by J. E. Gordon in *The New Science of Strong Materials*, 2nd Ed., p. 177, Princeton Univ. Press, "Beyond two percent, therefore, it is impossible to add fibers to a matrix and it becomes necessary to add the matrix to the fibers." Prolonged mixing with significant energy input and subsequent heat build up is required to incorporate fibers into liquid monomer and wet the fiber reinforcement.

Dental researchers have long wrestled with the problem of incorporating reinforcing fibers into thermoset, molding doughs. For example, Ladizesky, Chow and Cheng, using a cloth, impregnated with acrylic syrup, disclose, "The added technical procedure to construct the (fiber) reinforced dentures required an additional two hours (20%) of the standard laboratory time." *Denture Base Reinforcement Using Woven Polyethylene Fiber*, International Journal of Prosthodontics, Vol. 7, No. 4, p. 307-314 (1994). Targis® by Ivoclar is an example of a commercial pre-preg used in dentistry.

In the 1960's, Bowen, U.S. Pat. No. 3,066,112 incorporated particulate glass fillers into acrylic and vinyl ester resins used as dental fillings. Since then, small particulate fillers have been used to reduce the shrinkage of polymerization, increase hardness and improve abrasion resistance of these dental materials. However, these particle filled materials do not behave as fiber reinforced composites. Unless the critical aspect ratio, length/diameter, of a reinforcing fiber embedded in a resin matrix is equaled or exceeded, the composite material fails at low stress levels. Early dental composites did not contain particulate fillers with aspect ratios exceeding 4/1. In dental practice, particulate fillers are nearly spherical to enhance flow and mixing. Consequently, there is very little resistance to crack propagation in these composites. The result is very little enhancement in strength, stiffness and toughness of the dental composite material. Short particle fillers can actually make the dental materials brittle.

Fiber reinforcement has been incorporated in thermosetting molding doughs on an industrial scale and fiber reinforced industrial molding doughs are available as bulk molding compound (BMC) or sheet molding compound (SMC). However, these compounds have extremely high viscosities of 20-30 million centipoise. These high viscosities are manageable on the industrial scale where large hydraulic or electric presses can be used to generate the high molding pressures and temperatures necessary to mold these compounds. It is desirable to reduce these pressure and temperature requirements to enable molding of fiber reinforced resins under low pressure molding conditions.

Short shelf life, high molding pressure and temperature requirements have prevented the commercial production and distribution of fiber reinforced, polyester/acrylic, vinyl ester and acrylic, molding doughs to the very small user doing an occasional or opportunistic molding. Perishable, industrial BMC and SMC has, until now, been unsuitable for the small batches of premix used on the occasional, very small job of the dentist, the auto body mechanic, the boat repair person or the like. The small of occasional user, like the dentist, requires a dough moldable with manual pressure, curable at hot water temperatures and with a long shelf life at ambient temperature for their opportunistic type of work.

The use of additives to reduce the viscosity of the molding dough for low-pressure molding has had limited success. See: *Proceedings, Composites Institute 51st Annual Conference and Expo 96*.

Factors which prevent the easy, on site mixing of resin powders and reinforcing fibers, with curable liquid monomers include:

1) Resin particles and fibers tend to separate into layers and clumps, called agglomeration, and require periodic stirring to prevent this separation.

2) Prolonged mixing is required to incorporate particles and fibers into liquid monomer and thoroughly wet the particulate fillers and fiber reinforcement. If the resin particles dissolve immediately, viscosity build up prevents further mixing.

3) Dry ingredients must be very dry. Water contaminated powder and fiber will contaminate and weaken the composite. Surface moisture, adsorbed at ambient temperature, must be removed from particles and fibers so the monomer can wet and bond to these ingredients. Interfacial bonding between solid fillers and curable liquids must occur during polymerization if physical properties are to be enhanced rather than degraded in the composite.

4) The need for special processing equipment so that air is not incorporated in the mix producing porosity in the finished product.

Drying and mixing require time and special equipment not available to the opportunistic molder working at the occasional job.

The present invention provides fiber reinforced thermosetting bulk molding compounds (BMC), thick molding compounds (TMC) and sheet molding compounds (SMC) and precursors thereto with extended shelf stability.

The present invention also provides a solid thermoplastic elastomer thickener with secondary bonding for thermosetting molding compositions (BMC, TMC, SMC) which delays viscosity build-up to provide an opportunity to incorporate long fiber reinforcement and/or other additives and employ low pressure molding techniques without heating.

The present invention also provides a solid thermoplastic elastomer thickener with secondary bonding for thermosetting molding compositions which thickens by a physical mechanism and not a chemical mechanism, and participates in the cure.

The present invention also provides a solid thermoplastic elastomer thickener having reversible cross-links between polymer chains.

The present invention also provides a solid thermoplastic elastomer thickener for thermosetting molding compositions which facilitates the miscibility of the ingredients of the thermosetting molding compositions.

The present invention also provides a solid thermoplastic elastomer thickened thermosetting molding compositions, precursors thereto and methods for their preparation, which allow long fiber reinforcement to be easily incorporated therein.

The present invention also provides fiber reinforced thermosetting bulk molding compounds (BMC), thick molding compounds (TMC) and sheet molding compounds (SMC) and precursors thereto which can be molded under the pressures and temperatures of low pressure molding equipment.

The present invention provides an acrylic ionomer thickened thermosetting composition suitable for fiber reinforced molded retail products.

The present invention also provides a thermosetting premixed acrylic ionomer thickened molding composition, optionally with fiber reinforcement, suitable for dental appliances to reduce exposure of operator and patient to hazardous vapors.

The present invention also provides an ionomer thickened thermosetting molding composition which has an extended shelf life so as to reduce waste and/or make the product available to retail customers.

The present invention also provides a thermoplastic elastomer thickened thermosetting molding composition which experiences less shrinkage upon cure, requiring fewer adjustments (secondary finishing), to complete the part.

The present invention also provides a thermoplastic elastomer thickened thermosetting molding composition, optionally with long fiber reinforcement, which is compatible with existing techniques, equipment and procedures for producing dental appliances.

These embodiments are provided through the methods and compositions of this invention which comprises molding compositions and precursors thereto. This includes bulk molding compositions, thick molding compositions and sheet molding compositions. The BMC, TMC and SMC of this invention are each composed basically of four principle ingredients: thermosetting resins (resin solution) optionally fibers, optionally fillers and optionally additives. Only the resin solution is required for this invention. With this overall combination in place, it is feasible to use various types of specific ingredients to meet the required properties of the final product, and that makes BMC, TMC and SMC very versatile. Reinforced composites can be produced with an almost indefinite number of possible formulations.

Suitable resin solutions are made by dissolving a curable thermoplastic elastomer thickener in a curable monomer, oligomer or polymer co-solvent, as a means of making a curable molding composition. The resin solution may contain other resins that are soluble in the monomer oligomer or polymer, e.g.:

a) acrylic resins dissolved in a polymerizable monomer co-solvent where the polymerizable monomer co-solvent dissolves both the acrylic resin and the solid thermoplastic elastomer thickener, with styrene monomer, acrylic monomer, EGDMA (ethylene glycol dimethacrylate), TEGDMA (triethylene glycol dimethacrylate), UEDMA (urethane dimethacrylate) and similar acrylates being examples of monomer co-solvents;

b) polyester resins dissolved in a polymerizable monomer co-solvent, where the polymerizable monomer co-solvent dissolves both the polyester resin and the solid thermoplastic elastomer thickener, with styrene monomer, acrylic monomer, EGDMA, TEGDMA, UEDMA and similar acrylates being examples of monomer co-solvents;

c) styrenic resins dissolved in a polymerizable monomer co-solvent, where the polymerizable monomer co-solvent dissolves both the styrenic resin and the thermoplastic elastomer thickener, with styrene monomer, acrylic monomer, EGDMA, TEGDMA, UEDMA and similar acrylates being examples of monomer co-solvents; and d) vinyl ester resins dissolved in a polymerizable monomer co-solvent, where the polymerizable monomer co-solvent dissolves both the vinyl ester resin and the solid thermoplastic elastomer thickener, with styrene monomer, acrylic monomer, EGDMA, TEGDMA, UEDMA and similar acrylates being examples of monomer co-solvents.

The addition of fiber(s) provides a means for strengthening or stiffening the polymerized resin solution. The types often used are:

1) inorganic crystals or polymers, e.g., fibrous glass, quartz fibers, silica fibers, fibrous ceramics, e.g., alumina-silica (refractory ceramic fibers); boron fibers, silicon carbide whiskers or monofilament, metal oxide fibers, including alumina-boria-silica, alumina-chromia-silica, zirconia-silica, and others;

2) organic polymer fibers, e.g., fibrous carbon, fibrous graphite, acetates, acrylics (including acrylonitriles), aliphatic polyamides (e.g., nylons), aromatic polyamides, olefins (e.g., polypropylenes, polyesters, UHMW polyethylenes), polyurethanes (e.g., spandex, alpha-cellulose, cellulose, regenerated cellulose (e.g., rayon), jutes, sisals, vinyl chlorides (e.g., nylon), vinyl chlorides (e.g., vinyon), vinyldienes (e.g., saran), flax and thermoplastic fibers;

3) metal fibers, e.g., aluminum, boron, bronze, chromium, nickel, stainless steel, titanium or their alloys; and 4) "Whiskers", single, inorganic crystals.

The reinforced fibers can be in the form of a woven fabric or mat, a braided fabric or mat, a knitted fabric or mat, a loose-laid fabric or mat, or a sewn fabric or mat.

Suitable nonfibrous filler(s) are inert, particulate additives being essentially a means of reducing the cost of the final product while often reducing some physical properties of the polymerized, resin-fiber composite include calcium carbonates of various forms and origins, silica of various forms and origins, silicates, silicon dioxides of various forms and origins, clays of various forms and origins, feldspar, kaolin, flax, zirconia, calcium sulfates, micas, talcs, wood in various forms, glass (milled, platelets, spheres, micro-balloons), plastics (milled, platelets, spheres, micro-balloons), recycled polymer composite particles, metals in various forms, metallic oxides or hydroxides (except those that alter shelf life or viscosity), metal hydrides or metal hydrates, carbon particles or granules, alumina, tabular, aluminum powder, aramid, bronze, carbon black, carbon fiber, cellulose, alpha cellulose, coal (powdered), cotton, fibrous glass, graphite, jute, molybdenum, disulfide, nylon, orlon, rayon, silica, amorphous, sisal fibers, fluorocarbons and wood flour.

Suitable additives include polymerization initiators. Initiators are the means of generating the free radicals that begin and sustain polymerization. Said initiator-monomer combination, otherwise stable for at least a week at ambient temperature, is activated by means of elevating temperature, or by exposing to microwave, infrared, visible, ultra-violet or shorter radiations thus generating free radicals. Specific initiators are described below The solid thermoplastic elastomer thickener is used as the means of thickening the polymerizable resin solution into a moldable dough. These solid thermoplastic elastomer thickeners are typically ionomers such as acrylic ionomers or acrylic block copolymers in the form of solid powders or beads. A general formula of typical sheet molding, thick molding and bulk molding compounds, employing a variety of free radicals, initiators and other ingredients, which can be used in the method of thickening polymerizable resin solutions into moldable compositions provided by this invention follows. The solid ionomer/acrylic block copolymer powders or beads can be essentially linear or branched, acrylic polymers which act by slowly absorbing the polymerizable monomer resin solvent. The solid acrylic ionomer/acrylic block copolymer powder or bead thickeners are essentially free of initiators as a means to extend shelf life. These acrylic ionomer/block copolymer powder or bead thickeners are of a molecular weight, chemical composition and diameter as a means to be both slowly dissolving in and highly absorbing of the polymerizable monomer, oligomer or polymer solvent.

The following are functional additives and a means of imparting desirable properties to the molding composition or to the cured composite. These include, but are not limited to, anti-blocking agents, anti-caking agents, anti-foaming agents, antioxidants, anti-slip agents, anti-static agents, blowing agents, coupling agents, compatibilizers, dispersing aids, flatting agents, inhibitors, catalysts, accelerators/promoters, heat stabilizers, light stabilizers, wetting agents, plasticizers, extenders, thixotropics, flame, fire and smoke retarders, internal mold releases, lubricants, impact modifiers, tougheners, coloring/dyes/pigments, odorants and deodorants, low profile or low shrink additives, low pressure additives, clarifying agents, opacifiers, thickeners, viscosity control agents, permeability modifiers, solvents, waxes and thermoplastics.

The molding compositions preferably comprise:

a) a liquid monomer, oligomer, polymer or combination thereof, containing vinyl unsaturation, which polymerizes in the presence of an activated free-radical polymerization initiator and serves as a co-solvent for the solid resins;

b) at least one (1) wt. %, based on the total weight of liquid monomer, oligomer, polymer or combination thereof containing vinyl unsaturation in the composition, of a solid thermoplastic elastomer thickener having secondary bonding, preferably an ionomer or acrylic block copolymer thickener most preferably an acrylic ionomer thickener, wherein the solid thermoplastic elastomer thickener is:

i) soluble in said liquid monomer, liquid oligomer, liquid polymer or combination thereof containing vinyl unsaturation, ii) reactive with the liquid monomer liquid oligomer, or liquid polymer or combination thereof in the presence of an activated free-radical polymerization initiator free of active free-radical polymerization initiators, the acrylic ionomers/block copolymers liquid monomer, oligomers, polymers;

c) optionally, 0.5 wt. % or more, preferably 10 wt % or more based on the total weight of the composition, of long fiber reinforcement having an aspect ratio (L/D) greater than 5:1 and an average length of at least 0.25 mm, which is insoluble in the liquid monomer, oligomer, polymer or combination thereof;

d) a free-radical polymerization initiator, the activity of which can be restrained under ambient conditions or is inactive at ambient temperature so as to provide a shelf life of at least one month at ambient temperature.

The precursors to a molding composition comprise a thermosetting resin solution of:

a) a curable liquid monomer, liquid oligomer, liquid polymer or combination thereof containing vinyl unsaturation, which polymerizes in the presence of an activated free-radical polymerization initiator;

b) about one (1) wt. %, of the total weight percent of the liquid monomer, liquid oligomer, liquid polymer or combination thereof in the composition, of a solid thermoplastic elastomer thickener, preferably an acrylic ionomer or acrylic block/copolymer thickener resin which is soluble in and reactive with said liquid monomer, liquid oligomer, liquid polymer or combination thereof containing vinyl unsaturation. At least a portion of said liquid monomer, oligomer, polymer or combination thereof containing vinyl unsaturation is absorbed in the thermoplastic elastomer thickener, which is free of free-radical polymerization initiators; and c) optionally 0.5 wt. % and above preferably 10 wt % or more, based on the total weight of the composition, of long fiber reinforcement having an aspect ratio (L/D) greater than 5:1 and an average length of at least 0.25 mm, which is insoluble in the liquid monomer, liquid oligomer or liquid polymer.

The precursor compositions are shelf stable for at least one month and are preferably free of alkali earth metal oxide fillers and active free-radical initiators.

The methods comprise:

a) mixing a solid thermoplastic elastomer thickeners having secondary bonding such as an a thermoplastic ionomer or acrylic block copolymer, which is free of active free-radical polymerization initiators, with one or more liquid monomers, liquid oligomers, liquid polymers or a combination thereof with vinyl unsaturation which polymerizes in the presence of an activated free-radical polymerization initiator, wherein said solid thermoplastic elastomer thickener absorbs said liquid monomers, liquid oligomers, liquid polymers or combination thereof, and reacts with said liquid monomers, liquid oligomers, liquid polymers and combinations thereof, absorbed therein, in the presence of an activated free-radical polymerization initiator; and optionally b) aging the mixture of solid thermoplastic elastomer thickener resin, liquid monomer, oligomer, polymer or combination thereof containing vinyl unsaturation, and optional long fiber reinforcement for at least 24 hours to allow absorption of the liquid monomer, oligomer, polymer or combination thereof, by the solid acrylic resin.

This invention involves the preparation of novel compositions of stable, thermosetting, acrylic, styrenic, vinyl ester or polyester thickened doughs. Preferred embodiments of these compositions can be compounded to be compression molded at low pressure such as that from the manual screw or small hydraulic press familiar to a dental laboratory or low pressure molding equivalents. The preferred compositions can be cured at low temperatures using a hot water bath or UV or visible light source familiar to a dental laboratory. These compositions preferably include a highly absorbent, solid acrylic ionomer or acrylic block copolymer resin which functions as a thickener and allows the economic, bulk manufacture and packaging of fiber reinforced polyester, vinyl ester, styrenic or acrylic thickened compositions. This same highly absorbent, solid acrylic ionomer/acrylic block copolymer thickener resin allows a later distribution of the small quantities of these molding compositions to users remote in time and place from their site of manufacture.

The fiber reinforced acrylic, vinyl ester/acrylic and polyester/acrylic have a combination of sufficiently:

1) long shelf life;
2) low molding pressure; and
3) low curing temperature to be practical for the dentist or, the low production volume, custom molder, or the occasional molder at the opportunistic job.

The solid thermoplastic elastomer thickener is preferably a, soluble, highly absorbent, high molecular weight and unbranched thermoplastic acrylic resin, although branched polymers can be used. This thickener defeats the problems of:

1) Rapid viscosity build up during mixing of ingredients which prevents the thorough mixing and wetting of fillers and fibers by the liquid; and
2) Premature dough gelation.

The slowly soluble solid thermoplastic elastomer thickener with reversible cross-links via secondary bonding allows prolonged mixing of fiber, filler and liquid ingredients for periods as long as one hour. The slow dissolution of the solid thermoplastic elastomer thickener resin delays viscosity build up for a length of time required to thoroughly mix and wet reinforcing fibers in the premix slurry. This unique solid thermoplastic elastomer thickener resin can act entirely without alkaline earth additives. During a period of maturation, typically 1-4 days, the solid thermoplastic elastomer thickener absorbs the monomer solvent and dissolves to form a curable dough. This period of maturation allows the thermoplastic elastomer thickener to convert the wet slurry first into a paste and then into a dough. This dough can remain moldable at a low pressure for many months and as long as two years when totally devoid of unstable initiators of polymerization such as benzoyl peroxide or azo initiators in the case of acrylic ionomers or acrylic block copolymers. Since the solid acrylic acrylic ionomer or block copolymer thickener is preferably devoid of active initiators, stable initiators such as t-butyl peroxybenzoate and inhibitors can be incorporated into the molding compositions to avoid premature gelation of the dough. This facilitates a long shelf life.

The preferred acrylic resin used to form ionomer thickeners is an unbranched polymethyl methacrylate resin (PMMA) polymerized with an azo initiator in a suspension polymerization to a molecular weight of about 400,000 as determined by GPC using a conventional solvent for PMMA resins in about 0.1 mm particles/beads. An amount of 0.25 grams of a 400,000 molecular weight polymer dissolved in 50 ml of methylene chloride measured at 20° C. using a No. 50 Cannon-Fenske viscometer has an inherent viscosity of 1.25. These resins are commercially available from ICI Chemical under the trade name Elvacite® 2051. The ionomer can be created by melting this thermoplastic polymer and mixing in an inorganic salt.

This preferred thickening agent, a thermoplastic, solid acrylic ionomer thickener resin, is created by raising the temperature of the resin above the decomposition temperature of the azo initiators to eliminate residual initiator. This can be done in the autoclave immediately following suspension polymerization. Or, the resin particles/beads can be baked at up to 100° C. Either method decomposes and eliminates residual azo initiator. Baking may cause the particles/beads to stick together in aggregates. The baked particle/bead aggregate can be tumbled in a drum mixer for 30 minutes to break up clumps of resin beads. Preferably the polymer is baked at a temperature above the decomposition temperature of the azo initiator but below the polymer's glass transition temperature to avoid resin fusion.

A large particle/bead size minimizes the soluble exposed surface area and a very large high molecular weight minimizes polymer solubility. Various combinations of bead size and molecular weight make the beads more or less soluble during compounding. It's relative insolubility allows the resin to mix with a liquid monomer, oligomer or polymer, preferably methyl methacrylate, without producing a noticeable immediate increase in viscosity. The preferred thickening agent slowly absorbs the liquid, swells and dissolves during a one to four day maturation period in a sealed container at 70° F. The incubator is inverted at least once every 24 hours. During this maturation period, the viscosity of the wet slurry increases to a paste and then plateaus at a doughy consistency having more or less tack and viscosity depending on the nature and the ratios of liquid to solid ingredients.

With long fiber reinforcement incorporated therein, the molding composition provides thermoset articles, including dental appliances, which are composites with a unique property profile. These composites can substitute the metal frameworks and superstructure used to support dental crowns and bridgework. These composites also provide an alternative to ceramic build-ups and appliances made by lost wax casting. In addition to enhancing physical properties, the fiber reinforcement reduces shrinkage in the molded article, requiring fewer adjustments and finishing steps.

The relatively long shelf-life of the molding compositions of the present invention of at least one week provides adequate time to uniformly blend in the fiber reinforcement, even where mixing for extended periods of over one hour is required. Where the shelf life extends beyond one year, premixes can be prepared and waste is reduced. The extended shelf life is determined by the initiator and the additives utilized. Preferably, benzoyl peroxide catalyst is avoided, unless its activity at ambient temperature is suppressed, and the use of alkali metal oxide fillers to thicken the formulation is avoided.

Acrylic resins form a major component of the thickener and molding compounds of this invention. The term "acrylic resins" as used herein is intended to include acrylic monomers of the structure:

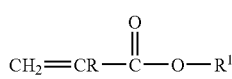

(I)

wherein R=H or a hydrocarbon based radical, and
R¹=a hydrocarbon based radical;

and oligomers, polymers and copolymers thereof. Included within the acrylic polymers are linear, branched and cross-linked homopolymers. Included within the acrylic copolymers are graft copolymers, random copolymers, block copolymers and cross-linked copolymers with two or more acrylate monomers of formula I or different monomers such as styrene and acrylonitrile (ASA resins) and acrylamide and methacrylamide. The preferred acrylic resins are the monomers, polymers and copolymers, both linear and cross-linked, of methylmethacrylate and ethylmethacrylate.

The hydrocarbon based radicals of R and R¹ include methyl, ethyl, propyl, isopropyl, and n-butyl, sec-butyl, isobutyl, tert-butyl, hexyl, heptyl, 2-heptyl, 2-ethylhexyl, 2-ethylbutyl, dodecyl, hexadecyl, 2-ethoxyethyl isobornyl and cyclohexyl. Preferred acrylates have R and R¹ selected from the $C_1$-$C_4$ series. The most preferred acrylic polymer is based on methylmethacrylate. A preferred methylmethacrylate acrylic polymer is Elvacite® 2051, available from ICI.

As indicated above, the terms "acrylic" and "acrylic resin" as used herein, are intended to include polyvinyl alcohols and polyvinyl acetates such as those derived from Bis GMA. Bis GMA is essentially an oligomer of the formula

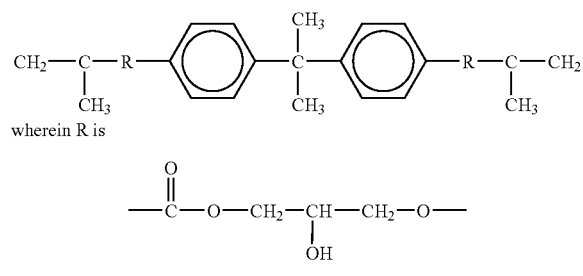

wherein R is which can be obtained by reaction of one molecule of bisphenol-A and 2 molecules of glycidylmethacrylate or by reaction of diglycidylether of bisphenol-A with methacrylic acid. Similar vinyl esters can be prepared using other polyepoxides and unsaturated monocarboxylic acids. These resins are cured at ambient or elevated temperatures by free-radical polymerization in a manner analogous to the acrylic resins containing monomers of formula (I) above.

The terms "acrylic" and "acrylic resin", as used herein, are also intended to include polymers and copolymers of the acrylate monomers described above and polymers produced from Bis-GMA described above.

The compositions of this invention include a liquid monomer, liquid oligomer or liquid polymer with vinyl unsaturation which cures to a thermoset polymer in the presence of a free-radical polymerization initiator. The liquid monomer oligomer or polymer must also be able to solubilize the solid thickener resin so that the liquid monomer, oligomer or polymer will be absorbed by the solid thickener resin. Suitable liquid monomers, oligomers and polymers include the liquid acrylic monomers described above and liquid oligomers (diacrylates and dimethacrylates) and polymers obtained therefrom. Suitable liquid oligomers and polymers also include the liquid Bis-GMA oligomers and polymers described above and further include liquid polyester resins and liquid styrene monomers and oligomers. Examples of dimethacrylates include ethylene glycol dimethacrylate (EGDMA), triethylene glycol dimethacrylate (TEGDMA) and urethane dimethacrylate (UEDMA).

The compositions of this invention contain at least a portion (1 wt %) of a solid thermoplastic elastomer thickener such as an acrylic ionomer/acrylic block copolymer resin. Preferably about 35 wt. %, most preferably 35-70 wt. % of the total weight of the liquid monomer, liquid oligomer, liquid polymer or combination thereof of the thickener is used in the composition. The solid thermoplastic elastomer thickener participates in the cure. Suitable acrylic ionomers are based on the resin sold under the trade name Elvacite® 2051 by ICI. This highly absorbent solid acrylic resin is amorphous and thermoplastic and preferably a linear and unbranched homopolymer. The acrylic resin preferably has 1) a high molecular weight, preferably above 100,000, most preferably about 400,000 as determined by conventional gel permeation chromatography (GPC) methods using conventional solvents for acrylic resins, such as methylene chloride; 2) a particle size of at least one micron and preferably about 0.005 mm (5 microns) to 0.1 mm and most preferably about 0.1 mm; and 3) essentially no active free-radical polymerization initiators. The solid acrylic resin preferably has an inherent viscosity of about 1.25 as tested in a Cannon-Fenske viscometer with 0.25 grams in 50 ml of methylene chloride at 20° C.

The solid thermoplastic elastomer thickener such as the acrylic ionomer/block copolymer resins absorb solvent, which in the composition of the invention is the liquid monomer, oligomer or polymer. The function of this solid thermoplastic elastomer thickener within the molding composition is to provide a delayed viscosity build, thus permitting the prolonged mixing necessary to incorporate thoroughly wet high volumes of filler and fiber into the molding composition. Absorption of the liquid monomer, oligomer or polymer is preferably not substantially complete until at least 2 hours after being mixed with the solid acrylic resin. Most preferably, absorption of the liquid monomer, oligomer or polymer by the solid acrylic resin (viscosity build) is substantially complete (about 90%) within 1 to 4 days from forming a mixture thereof.

The delayed absorption of the liquid provides for a low viscosity which is sufficiently low to enable bulk molding compounds, thick molding compounds and sheet molding compounds to be molded under the temperatures and pressures of low pressure equipment.

The amount of acrylic ionomer or block copolymer (acrylics and vinyl esters) within the compositions of this invention can vary widely, particularly when employed with other compatible resins. The amount of acrylic ionomer (liquid and solid) preferably ranges from 35 to 95 wt. % of the liquid monomers, oligomers and/or polymers in the composition, more preferably from about 50-70 wt. % of these liquid components in the composition. Acrylic resins can form 100% of resin component of the composition except where vinyl ester resin is the "acrylic resin".

The compositions of the present invention can include other resins which will either participate in the free-radical polymerization or remain inert during polymerization, functioning as organic fillers or other additive. Essentially any liquid or solid vinyl or diene containing monomer, oligomer, polymer or copolymer which will participate in free-radical polymerization at ambient temperature can be used. These include polyesters and those derived from the monomers selected from the group consisting of vinyl ethers, acrylonitrile, styrene, propylene, vinyl acetate, vinyl alcohol, vinyl chloride, vinyldiene chloride, butadiene, isobutylene, isoprene, divinylbenzene and mixtures thereof. An example of an inert resin is polyethylene, which in particulate form can function as an organic filler. However, it is preferable that acrylic resins, i.e., those derived from the monomers of formula 1 and the vinyl ester resins be used exclusively in the molding compositions of this invention.

Embodiments of this invention include thermosetting molding compositions and precursors thereto. The thermosetting molding compositions of the present invention include a free-radical polymerization initiator. This initiator can be any conventional free-radical initiator. The initiator preferably has an activity which can be restrained (inhibited/retarded), preferably at ambient conditions and most preferably elevated temperatures. Free-radical initiators which initiate polymerization by exposure to either elevated temperatures above ambient temperature and/or exposure to UV or visible light are well suited for providing molding compositions with the requisite shelf stability of at least one week. Suitable temperature activated initiators include t-butyl peroxybenzoate, sold under the trade name Trigonox® by Akzo Chemicals Inc., t-butyl hydro-peroxide and the peroxy ketals, also available from Akzo Chemicals Inc. and the VASO catalysts such as VAZO-88® 1,1-azobi (cyclohexane carbonitrile) available from DuPont. Other suitable initiators include ketone peroxides, alkyl peroxides, aryl peroxides, peroxy esters, perketals, peroxydicarbonates, alkylhydroperoxides, diacyl peroxides, VAZO compounds, photoinitiators and heat labile photoinitiators.

Examples of ketone peroxides include methyl ethyl ketone peroxide, methyl isobutyl ketone peroxide, acetyl acetone peroxide and cyclohexanone peroxide.

Examples of alkyl peroxides and aryl peroxides include dicumyl peroxide, tert.butylcumyl peroxide, di-tert.amyl peroxide, 1,3-di(2-tert.butylperoxy isopropyl)benzene, di-tert.butyl peroxide, 2,5-dimethyl 2,5-di(tert.butylperoxy)hexane, 2,5-dimethyl 2,5-di(tert.butylperoxy)hexane, dibenzoyl peroxide, tert.butyl 3-isopropenylcumyl peroxide, 1,4-di(2-tert.butylperoxy isopropyl)benzene, 1,4-di(2-neodecanoyl peroxy isopropyl)benzene, di(1-hydroxycyclohexyl) peroxide, diisobutyryl peroxide, dioctananoyl peroxide, didecanoyl peroxide and 2,2-Bis(4,4-di(tert.butylperoxy-cyclohexyl)propane.

Examples of peroxyesters include tert-butyl peroxy-2-ethylhexanoate (Trigonox® 21), tert-amyl peroxy-2-ethylhexanoate (Trigonox® 121), tert-butyl peroxy-3,5,5-trimethylhexanoate (Trigonox® 42S), tert-butyl peroxy-2-methylbenzoate (Trigonox® 97-C75), 2,5-dimethyl 2,5-di(benzoylperoxy)hexane (AZTEC), 2,5-dimethyl-2,5-di-(2-ethyl-hexanoylperoxy)hexane (Trigonox® 141), tert-butyl peroxy-isopropyl carbonate (Trigonox® BPIC), tert-butyl peroxy-stearyl carbonate, tert.-butyl peroxyacetate, tert.-amyl peroxyacetate, tert.-butyl peroxypivalate, tert.-amyl peroxypivalate, tert.-butyl peroxyneodecanoate, tert.-amyl peroxyneodecanoate, tert.-butyl peroxybenzoate, tert.-amyl peroxybenzoate (Trigonox® 127), tertiary-butyl peroxy 2-ethylhexyl carbonate, tertiary-amyl peroxy 2-ethylhexyl carbonate, cumyl peroxyneodecanoate, cumyl peroxyneoheptanoate, tertiary-butyl peroxyneoheptanoate, tertiary-butyl peroxyisobutyrate, tertiary-butyl monoperoxy maleate and tert.-butyl peroxydiethyl acetate.

Examples of perketals include 1,1-di(t-amylperoxy)cyclohexane (USP-90MD) 2,2,-di(tert.butylperoxy)butane, n-butyl 4,4-di(tert.butylperoxy)valerate ethyl 3,3-di(tert.butylperoxy)butyrate, 3,3,6,6,9,9-hexamethyl 1,2,4,5-tetraoxa cyclononane, 1,1-di-(tert-butylperoxy)-3,3,5-trimethylcyclohexane, 1,1-di-(tert-butylperoxy)cyclohexane and di-tert.-butyldiperoxyazelate.

Examples of peroxy dicarbonates include di-(sec-butyl) peroxydicarbonate, di-(n-butyl)peroxydicarbonate, di-(2-ethylhexyl)peroxydicarbonate di-(4-tert-butylcyclohexyl) peroxydicarbonate, dicyclohexyl peroxydicarbonate, dimyristyl peroxydicarbonate and dicetyl peroxydicarbonate.

Examples of alkylhydroperoxides include cumene hydroperoxide, 1,4-di(2-hydroperoxy isopropyl)benzene, ter.t.amyl hydroperoxide tert.butyl hydroperoxide, 2,4,4-trimethylpentyl-2 hydroperoxide and diisopropylbenzene monohydroperoxide Examples of diacyl peroxides include acetyl cyclohexane sulphonyl peroxide, di(2,4-dichlorobenzoyl)peroxide, di(3,5, 5-trimethyl hexanoyl)peroxide dilauroyl peroxide, disuccinic acid peroxide and di(4-methylbenzoyl)peroxide.

Examples of VAZO compounds include 2,2'-azobis(2,4-dimethylpentanenitrile), 2,2'-azobis(2,4-dimethylvaleronitrile) (Vazo® 51), 2,2'-azobis(2-methylpropanenitrile), 2,2'-azobis(isobutyronitrile) (Vazo® 64), 2,2'-azobis (methylbutanenitrile), 2,2'-azobis(methylbutyronitrile) (Vazo® 67), 1,1'-azobis(cyclohexanecarbonitrile) or 1,1'-azobis(cyanocyclohexane) (Vazo® 88).

Examples of photoinitiators include 2-butoxy-1,2-diphenylethanone, 2,2-dimethoxy-1,2-diphenylethanone, a mixture of oligo(2-hydroxy-2-methyl-1-(4-(1-methylvinyl)phenyl)propanone)+2-hydroxy-2-methyl-1-phenyl-1-propanone, oligo(2-hydroxy-2-methyl-1-(4-(1-methylvinyl) phenyl)propanone), a mixture of 2,4,6-trimethylbenzophenone+4-methylbenzophenone+oligo(2-hydroxy-2 methyl-1-(4-(1-methylvinyl)phenyl) propanone), a mixture of oligo(2-hydroxy-2-methyl-1-(4-(1-methylvinyl) phenyl)propanone)+2-hydroxy-2-methylphenyl 1-propanone, 2,4,6-trimethylbenzoyldiphenylphosphine oxide+ methylbenzylphenone, a mixture of 2,4,6-trimethylbenzophenone+4-methylbenzophenone, a mixture of 2-isopropylthioxanthone, ethyl 4-(dimethylamino)benzoate and methyl-benzophenone, benzophenone and diaryl iodonium hexafluoroantiomonate Examples of miscellaneous initiators include triaryl sulfonium hexafluorophosphate+propylene carbonate and triaryl sulfonium hexafluoroantimonate+propylene carbonate.

To obtain stable mixtures, the initiator should be compatible with the acrylic resin and preferably, the acrylic resin is inhibited with the methyl ether of hydroquinone. Preferred curing initiators (and inhibitors) provide a formulation which remains stable for months, preferably at least from six months to one year, preferably in excess of two years. Such curing initiators are typically heat activated at temperatures well above ambient temperature and more typically above 75° C. An example of a preferred free-radical initiator which can be activated at temperatures above 75° C., including temperatures above the glass transition temperature of polymethylmethacrylate acrylic resin (Tg=105° C.), is t-butyl peroxybenzoate. Activation temperatures in the range of 75° C. to 200° C. can be used with t-butylperoxybenzoate and are often preferred.

The curing initiator can be used in amounts analogous to the amounts used in conventional acrylic-based molding compositions, which typically range from about 0.12 to 1.0 weight % of the molding composition, more typically about 0.3 to 1.0 weight %.

An optional element of the compositions of the present invention is fiber reinforcement. These fibers are "long" fibers. The phrase "long fiber", as used herein, is intended to refer to those fibers having an aspect ratio, which is the ratio of fiber length to fiber diameter (L/D), that is theoretically large enough to result in fiber fracture near the midpoint when stressed. Long fibers comprised of conventional reinforcement materials have an aspect ratio exceeding 5:1. The lowest value for the aspect ratio at which this first occurs is referred to as the "critical aspect ratio." The critical aspect ratio defines the critical length at which a certain diameter fiber is considered "long". Fibers of different materials such as, for example, aramid, glass, graphite, etc., have different critical aspect ratios. In addition, identical fibers embedded in different matrices such as, for example, matrices of acrylic, epoxy, and polyester resins, have different critical aspect ratios. Examples of critical aspect ratios and critical lengths for various reinforcements and matrices are shown in Table 1 below.

TABLE 1

| Fiber | Matrix | $(l/d)_1$ | $l_{c1}$ |
|---|---|---|---|
| E-Glass | Polypropylene | 140 | 1.78 mm |
| E-Glass | Epoxy | 34 | 0.43 |
| E-Glass | Polyester | 100 | 1.27 |
| Carbon | Epoxy | 47 | 0.33 |
| Carbon | Polycarbonate | 106 | 0.74 |

[1]Engineering Materials Reference Book, 2nd Ed., p. 77, Ed. Michael Bauccio, ASM International, 19941

The aspect ratio for fibers within a matrix comprised of a cured acrylic resin typically will be well above 5:1 for commercially available fiber reinforcements. Typically, the aspect ratio will be above 50:1 and it is often above 150:1. Conventional reinforcement fibers of glass, aramid, graphite, etc. having a length as low as 0.25 mm can function as long fibers within the compositions of this invention once cured since the fibers are thin and their aspect ratios are high.

While the lower limit for the preferred lengths of the long fibers is about 0.25 mm, the long fibers can be continuous, i.e. no measurable limit, when the molding composition is in the form of a sheet. The long fibers utilized in the molding doughs provided by this invention do have an upper limit for the preferred fiber lengths of about 6.5 mm. Preferred lengths for continuous fibers are at least 1 inch. Suitable types of fibers are 1) inorganic crystals or polymers, such as fibrous glass, quartz fibers, silica fibers and fibrous ceramics, which include alumina-silica (refractory ceramic fiber), boron fibers, silicon carbide whiskers or monofilament metal oxide fibers, including alumina-boria-silica, alumina-chromia-silica, zirconia-silica, and the like; 2) organic polymer fibers, such as fibrous carbon, fibrous graphite, acetates, acrylics (including acrylonitriles), aliphatic polyamides (e.g., nylons), aromatic polyamides, polyesters, flax, polyethylenes, polyurethanes (e.g., spandex), alpha-cellulose, cellulose, regenerated cellulose (e.g., rayon), jutes, sisals, vinyl chlorides, e.g., vinyon, vinylidienes (e.g., saran) and thermoplastic fibers; 3) metal fibers, such as aluminum, boron, bronze, chromium, nickel, stainless steel, titanium and their alloys; and 4) "Whiskers" which are single, inorganic crystals.

The reinforcing fibers preferably comprise such materials as glass, metals, carbon, rayon, cellulose acetate, cellulose triacetate and the like, Mylar® polyester, aramid/Kevlar®, Nomex® aramid fiber or polyethylene fiber in continuous or discontinuous form. A preferred fiber is silanized chopped glass fiber. The preferred length of fiber reinforcement utilized with the acrylic-based doughs such as bulk molding compounds (BMC), particularly Elvacite® 2051 bulk molding compounds, falls in the range of 0.25 to 6.5 mm. The length of fiber reinforcement utilized with vinyl ester BIS-GMA doughs preferably ranges from 0.1 to 6.5 mm. Fibers can be used in an amount of from 10 wt. % up to about 90 wt. % for sheet materials. In dough molding compositions such as BMC, levels of fiber reinforcement above 25 wt. % show little advantage, although higher levels such as 50 wt % can be easily used. The dough molding compositions (BMC) preferably have at least 10 wt. % long fiber. Sheet molding compounds (SMC) can use discontinuous or continuous reinforcing fibers, filaments, braided fabrics, knit fabrics, woven fabrics or loose laid fabrics.

A fiber composite is formed upon cure of the thermosetting molding compositions of the present invention. Where the thermosetting molding composition provides a composite with discontinuous fibers, the stress along the fiber is not uniform. There are portions along each fiber end where the tensile stresses are less than that of a fiber that is continuous in length. This region is often called the fiber ineffective length. The tensile stress along the fiber length increases to a maximum along the middle portion of the fiber. If the fiber is sufficiently long (critical length) so that the ratio of the length to diameter, or aspect ratio, equals or exceeds the critical aspect ratio, the mid-fiber stress will be equal to that of a continuous filament.

The critical aspect ratio which would result in fiber fracture at its mid-point can be expressed as $(l/d)_c = S_f/2Y$. Where $(l/d)_c$ = the critical aspect ratio, l=length of the fiber and w=width of the fibers, $S_f$ is the tensile stress of the fiber and Y is the yield strength of the matrix in shear or the fiber-matrix interfacial shear strength, whichever value is lower.

If the fiber is shorter than the critical length, the stressed fiber will de-bond from the matrix and the composite will have low strength. When the length is greater than the critical length, the stressed composite will not de-bond the fibers and will exhibit high strength.

The rule of mixtures for discontinuous fiber composites may be expressed as $S_c = V_f S_f(1-l_c/2l) + V_m S_m$ where $S_c$ is the tensile strength of the composite, $S_m$ is tensile strength of the matrix, l is the actual length of the fiber, $l_c$ is the critical length of the fiber, $V_f$ is the volume fraction of the fiber and $V_m$ is the volume fraction of the matrix. For the composite to have a higher strength than its matrix, a minimum $V_f$ must be exceeded. This value may be 0.1 or greater for the plastic matrix composites. Because of high stress concentrations at the discontinuities that occur at the fiber ends, tensile strength of a discontinuous fiber composite will be from about 55% to 86% of the fiber tensile strength and the modulus can approach 90% to 95% of the corresponding continuous fiber composite.

The molding compositions of this invention can contain conventional additives where desired to obtain a particular additive effect either in processing or in the finished product. These include mechanical property modifiers, processing aids, surface property modifiers, physical property modifiers, and electrical property modifiers. Specific additives include anti-blocking agents, anti-caking agents, anti-foaming agents, antioxidants, anti-slip agents, anti-static agents, blowing agent, coupling agents, compatibilizers, dispersing aids, flatting agents, inhibitors, catalysts, accelerators/promoters, heat stabilizers, light stabilizers, wetting agents, plasticizers, extenders, thixotropics, flame, fire and smoke retarders, internal mold releases, lubricants, impact modifiers, tougheners, coloring/dyes/pigments, odorants and deodorants, low profile or low shrink additives, low pressure additives, clarifying agents, opacifiers, thickeners, viscosity control agents, permeability modifiers, biodegrading agents, flame retardants, foaming agents, blowing agents, solvents and waxes can be used. Conventional colorants can be used, such as dyes or pigments when necessary. In dental appliances, titanium dioxide and cadmium (peach colored) pigments are often used. The amount of colorant typically ranges from about 0.1-1.0 wt. % of the molding composition. Other suitable additives are dispersing agents, typically used in an amount of 1 to 8 wt. % of the molding compositions. An example of suitable dispersing agent is fumed silica sold under the trade name Cab-O-Sil®. Other additives include surfactants and mold release agents. Suitable mold release agents are stearate/sterol alcohol and suitable surfactants are di-octylsulfosuccinate (sodium salt). The mold release agents are typically used in an amount of from 0.2-1.0 wt. % of the molding composition and the surfactants are used in the amount of 0.01 to 0.5 wt. % of the molding composition.

It may be desirable to add fillers, either inorganic or organic, with or without fiber reinforcement to reduce shrinkage and distortion and improve the physical properties of the resulting composite. Preferred examples of inorganic fillers include silicate glass, fused silica, quartz and silinated glass ballotini. Others include calcium carbonates of various forms and origins, silica of various forms and origins, silicates, silicon dioxides of various forms and origins, clays of various forms and origins, calcium sulfates, micas, talcs, wood in various forms, glass (milled, platelets, spheres, micro-balloons) plastics (milled, platelets, spheres, micro-balloons), recycled polymer composite particles, metals in various forms, metallic oxides or hydroxides, metal hydrides or metal hydrates, carbon particles or granules, alumina (tabular), aluminum powder, aramid, bronze, carbon black, carbon fiber, cellulose, alpha cellulose, coal (powdered), cotton, fibrous glass, graphite, jute, molybdenum disulfide, nylon, orlon, rayon, silica (amorphous), sisal fibers, fluorocarbons, wood flour, kaolin, flax, zirconia and Feldspar. Although the more conventional metal oxide fillers such as magnesium oxide and calcium oxide do not inhibit the immediate physical properties of the resulting product and are suitable for the molding compositions of this invention, they do cause the molding compositions to thicken over time and therefore, molding compositions essentially free of these metal oxides thickeners are preferred. Metal oxide thickeners form ionic polymer networks with resin carboxyl groups requiring high pressure to break these bonds.

As to the organic fillers, the solid thermoplastic elastomer thickener participates in the reaction unlike conventional fillers, an example being Elvacite® 2051 (ICI), which is a thermoplastic polymethyl methacrylate free of benzoyl peroxide catalytic initiator. The organic fillers which do not react are typically used in an amount from about 0 to 30 wt. %, but compositions of this invention with preferred levels of organic fillers typically range from 0 to 20 wt. %, based on the total compound.

Compositions of this invention can be prepared using conventional mixing equipment such as a high shear blender. The components of the molding composition are preferably first combined into two separate portions, a liquid mixture portion and solid mixture portion. The liquid mixture includes the liquid acrylic monomer, oligomer or polymer (vinyl ester resin, or polyester resin) optionally surfactant and catalyst. The dry ingredients are mixed thoroughly in a high shear blender and typically include the solid thermoplastic elastomer thickener (such as the acrylic ionomer/block copolymer) colorants, dispersing agents. Preferably, the reinforcing fibers are not blended into the solid mixture. Following preparation of the solid and liquid mixture portions, the two portions are combined in a low shear mixer for about five minutes, following which the reinforcing fibers are slowly added over an extended period. The fiber reinforcement is mixed so that there is no agglomeration of fibers and a uniform distribution is obtained by wetting these fibers. Once the fibers have been distributed throughout the liquid component, the mixture is allowed to stand (mature) for about two to five days with occasional stirring. This technique provides a bulk-molding compound (BMC) consistent with the present invention. In forming sheet molding compounds (SMC), a mixture of liquid and solid components or a single component formulation are applied to a continuous fiber network of either knit, woven, sewn or braided fabrics or loose-lay filaments.

With the appropriate curing initiator blended therein, the thermosetting molding composition can be hardened by the application of heat or exposure to UV or visible light. The methods of this invention are suitable for preparing compositions with no polymerization initiator or with polymerization initiators that are active or inactive at ambient temperature. The vinyl ester resin blends are well suited for use with curing initiators that are activated by exposure to bright light. Of the heat-cured resins, those which are activated at temperatures above 75° C. are preferred. Such temperatures are typically above the glass transition temperature of the acrylic resin which forms the matrix. The thermosetting molding compositions can be conveniently cured at temperatures of from 75° C. to 200° C. in an oil bath.

The compositions of this invention are well suited for producing dentures, inlays, crowns, bridgework, orthodontic devices, etc. However, these molding compositions are not confined to uses within the fields of dentistry, orthopedics and podiatry. These compositions can be used in industrial applications such as model making and the production of utensils, automotive parts, bathroom fixtures and wherever enhanced physical properties must be combined with weatherability and ease of processing.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth in degrees Celsius; and, unless otherwise indicated, all parts and percentages are by weight. In addition, unless otherwise indicated, all resin formulations are inhibited with trace amounts of either hydroquinone or methylethyl hydroquinone.

The disclosure of all patents and publications mentioned above and below are hereby incorporated by reference.

Protocol A

Stable, reinforced, thermoset, molding doughs of this invention are prepared according to the following protocol:

Phase 1: combine by TOTAL weight percent and mix separately as parts A and B:

Part A—The Liquid:
  46 parts methylmethacrylate monomer;
  8 parts ethylmethacrylate monomer;
  4.5 parts ethyleneglycol dimethacrylate (cross-linker);
  0.2 parts t-butyl peroxybenzoate (initiator);
  0.1 parts dioctylsulfosuccinate, sodium salt (surfactant) and
  A trace of methylethylhydroquinone (inhibitor).

Mix liquids thoroughly in a high shear blender, e.g. Lighting shear blender for 5 minutes.

Part B—The Powder:
1.0-8. % dispersing agent (Silica);
Colorants: $TiO_2$, dyes and/or pigments;
33 parts acrylic ionomer thickener formed from Elvacite® 2051 (ICI) polymethyl methacrylate;
5 parts Aramid PULP, no. 543; and
0.2 parts (peach) pigment.

Mix powders very thoroughly in a high shear blender for 5 minutes.

Phase 2: Combine liquid and powder by adding Part B, powder, to Part A, liquid, in a low shear mixer, e.g., Ross, Double Planetary machine, and mix for 45 minutes. Transfer to a sealed container and allow to stand (mature) for 1-4 days at 70° F. Occasional turning or stirring may be needed during maturation, depending on the formula, to incorporate free, liquid monomer.

The end product is a thick, pliable putty with a minimal tack.

Protocol B:

Stable, reinforced, thermoset, molding doughs of the present invention are prepared as follows:

Phase 1: Combine by weight and mix, separately, parts A and B:

Part A—The Liquid: A terpolymer resin mixture of:
70 grams methyl methacrylate resin;
20 grams ethyl methacrylate resin;
10 grams Bis-GMA vinyl ester resin, e.g., Nupol® Bis-GMA vinyl ester resin 046-4005;
0.25 grams catalyst (t-butyl peroxybenzoate, or t-butyl hydro-peroxide, peroxy-ketals or VAZO® catalyst);
0.14 grams di-octylsulfosuccinate (sodium salt), a surfactant.

Part B—The Powder: Mix very thoroughly in a high shear blender:
5.0 grams silica dispersing agent;
0.4 grams Colorants: "Cadmium" pigment;
40.0 grams methylmethacrylate ionomer thickener prepared from Elvacit® 2051 methylmethacrylate polymer (ICI), which is free from benzoyl peroxide catalytic initiator;
6.0 grams fibrillated polyethylene, Short Stuff® polyethylene, for mold lubrication, reduction of shrinkage and distortion, and to physically stabilize the suspension of the various powders in the mixture;
2.0 grams Calcium silicate (optional) to facilitate processing;
20.0 grams silinated, glass ballotini.

Part C,
25.0 grams Reinforcing fibers: glass, metals, carbon, nylon, aramid fiber (KEVLAR®), especially in its fibrillated forms, e.g., DuPont's 540-543 aramid fiber (KEVLAR®) pulp, or, Nomex® aramid fiber.

Phase 2:
1) Place 75 grams of Part A—"The Liquid" in a low shear mixer, add Part B—"The Powder" and mix slowly and thoroughly for 5 minutes.
2) Slowly add Part C, 25.0 grams of reinforcing fibers, and continue to mix for 15 minutes.

Cover the mix in a sealed container and allow to stand (mature) for 2-4 days. Occasional stirring or turning may be needed, depending on the formula, to incorporate free liquid resin.

The end product is a thick, pliable putty with a minimal tack.

A typical bulk molding formulation is as follows:

|  | wt. % |
|---|---|
| solid acrylic ionomer | 26 |
| liquid monomer | 2.5 |
| calcium carbonate | 50 |
| zinc stearate (mold release) | 1 |
| t-butyl peroxide benzoate | .5 |
| glass fibers (¼ in) | 20 |

Sheet molding compound is composed of basically four principle ingredients: the thermosetting components (liquid monomer, oligomer or polymer, and solid acrylic resin), fiber reinforcement, optionally additives and optionally fillers. It is feasible to use various types of specific ingredients for each of the four principle ingredients such that an almost indefinite number of formulations are possible.

The sheets are stored to age in a controlled environment. The maturation period (normally 2 to 5 days) is, in effect, the time needed for the paste viscosity to reach a level sufficient for molding. The paste viscosity at the time of compound is typically below 40,000 cps (mPas·s), whereas at the time of molding, the viscosity is preferably $20\times10^6$ to $30\times10^6$ cps.

SMC Formulation with Thermoplastic Resin

| SMC Paste | Part by Wt. | Range |
|---|---|---|
| Solid acrylic resin | 60 | 15-25 |
| Liquid monomer | 100 | 20-25 |
| Thermoplastic resin | 40 | 5-12 |
| Calcium carbonate (3-5 μm particle size) | 150 | 20-40 |
| t-butyl peroxybenzoate | 1.5 | |
| Zinc stearate (mold release) | 4.0 | |
| Fiber glass - Chopped (1 inch) | 125 | 20-40 |

EXAMPLES 1-4

Examples 1-4 describe bulk molding compounds of this invention prepared in accordance with Protocol A. The components of these molding compounds are shown in Table 2 below wherein all % are in wt. %:

TABLE 2

|  | Example No. | | | |
|---|---|---|---|---|
|  | 1 | 2 | 3 | 4 |
| Resin, Liquid | | | | |
| Methyl methacrylate | 61.00% | | 30.50% | |
| Ethyl methacrylate | | 61.00% | 30.50% | |
| Other Acrylic Resins or Copolymers | | | | 63.00% |
| Curing Agent(s) | | | | |
| t-butyl peroxybenzoate | 0.30% | 0.30% | 0.30% | 0.30% |
| Thickener | | | | |
| Cab-O-Sil, fumed silica | 2.00% | 2.00% | 2.00% | 2.00% |
| Acrylic ionomer powder* | 36.70% | 36.70% | 36.70% | 34.70% |

*All thickening and/or polymer powder is benzoyl peroxide free. Example: ICI's, Elvacite ® 2051 or, Elvacite ® 2697 modified by the addition of a salt.

EXAMPLES 5-8

Examples 5-8 describe bulk-molding compounds of this invention prepared in accordance with protocol A. The components of the molding compounds are shown in Table 3 below.

TABLE 3

| | Example No.: | | | |
|---|---|---|---|---|
| | 5 | 6 | 7 | 8 |
| Resin, Liquid | | | | |
| Methyl methacrylate | 43.11% | 35.00% | 40.00% | |
| Ethyl methacrylate | | 8.11% | 8.10% | |
| Other Acrylic Resins or Copolymers | | | | 52.05% |
| Reinforcement | | | | |
| Glass Fiber | 15.00% | 15.00% | | |
| Others** | | | 15.00% | 15.00% |
| Mineral Filler | | | | |
| Glass/Quartz | 20.00% | 20.00% | 9.00% | |
| Feldspar | | | 5.00% | |
| Organic Filler (Example: Powdered polyethylenes) | | | | 13.00% |
| Coupling Agent | | | | |
| Silane | 2.00% | 2.00% | 2.00% | 2.00% |
| Curing Agent(s) | | | | |
| t-butyl peroxybenzoate | 0.25% | 0.25% | 0.30% | 0.30% |
| Thickener | | | | |
| Acrylic Polymer Powder | 17.34% | 17.34% | 15.35% | 15.35% |
| Silica | 2.00% | 2.00% | 2.00% | 2.00% |
| Low profile Additive: | | | | |
| Polyethylene Powder or Pulp | | | | 3.00% |

**Includes those selected from metal fibers and flakes, phosphate fiber, Wallostonite, Dawsonite, Micro Fiber glass, processed mineral fiber, TISMO (old Fibex), magnesium oxysulfate fiber (MOS)

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

What is claimed:

1. A method of preparing a shelf stable composition which comprises:
  a) mixing a solid thermoplastic elastomer thickener which has secondary bonding with one or more reactive liquid monomers, liquid oligomers, liquid polymers or a combination thereof which polymerizes in the presence of an activated free-radical polymerization initiator,
    wherein said secondary bonding comprises hydrogen bonding, Van Der Waals forces, physical chain entanglements and crystal lattice interactions,
    wherein said solid thermoplastic elastomer thickener is free of active free-radical polymerization initiators, absorbs said reactive liquid monomers, liquid oligomers, liquid polymers or combination thereof, and reacts with said reactive liquid monomers, liquid oligomers, liquid polymers or combination thereof, in the presence of an activated free-radical polymerization initiator; and
  b) aging the mixture of solid thermoplastic elastomer thickener, and reactive liquid monomers, liquid oligomers, liquid polymers or combination thereof, for at least 24 hours to allow absorption of the reactive liquid monomer, liquid oligomer, liquid polymer or combination thereof by the solid thermoplastic elastomer thickener.

2. A method as in claim 1, wherein long fiber reinforcement is additionally mixed with said solid thermoplastic elastomer thickener, wherein said long fiber reinforcement is insoluble in said thermoplastic elastomer thickener, has an aspect ratio, L/D, greater than 5:1 and has a length at least about 0.25 mm.

3. The method as in claim 2 comprising the additional step of mixing a free-radical polymerization initiator with said mixture of solid thermoplastic elastomer thickener, reactive liquid monomers, liquid oligomers, liquid polymers or combination thereof and long fiber reinforcement wherein the free-radical polymerization initiator is inactive at ambient temperature or its activity can be restrained under ambient conditions.

4. A method as in claim 1 wherein the solid thermoplastic elastomer thickener is an acrylic block copolymer.

5. A method as in claim 1, wherein the reactive liquid monomer has vinyl unsaturation and is selected form the group consisting of acrylic acid monomers, methacrylic acid monomers, acrylate monomers, methacrylate monomers, vinyl ether monomers, acrylonitrile monomers, propylene monomers, vinyl acetate monomers, vinyl alcohol monomers, vinyl chloride monomers, vinylidine chloride monomers, butadiene monomers, isobutadiene monomers, isoprene monomers, divinyl benzene and mixtures thereof and the reactive liquid oligomer is selected from acrylic oligomers, methacrylic oligomers, styrene oligomers, vinyl ester oligomers and polyester oligomers.

6. A method as in claim 1, wherein said fiber reinforcement is selected from the group consisting of glass fibers, carbon fibers, metal fibers, rayon fibers, aramid fibers and polyolefin fibers.

7. A method as in claim 2, wherein the long fiber reinforcement comprises 15 wt. % to 50 wt. % of the total composition.

8. A composition which comprises:
  a) a reactive liquid monomer, liquid oligomer, liquid polymer or combination thereof with vinyl unsaturation, which polymerizes in the presence of an activated free-radical polymerization initiator;
  b) at least 1 wt. %, based on the total weight of the reactive liquid monomer, liquid oligomer, liquid polymer or combination thereof in the composition, of a solid thermoplastic elastomer thickener with secondary bonding which
    i) is soluble in said reactive liquid monomer, liquid oligomer, liquid polymer or combination thereof, and
    ii) reacts with the reactive liquid monomer, liquid oligomer, liquid polymer or combination thereof containing vinyl unsaturation in the presence of an activated free-radical polymerization initiator;
    iii) is free of active free-radical polymerization initiators,
    iv) has at least a portion of said reactive liquid monomer, liquid oligomer, liquid polymer or combination thereof absorbed therein; and
    v) comprises a solid acrylic block copolymer,
  c) a free-radical polymerization initiator, the activity of which can be restrained under ambient conditions or is inactive at ambient temperature so as to provide a shelf life of at least one month at ambient temperature.

9. A thermosetting molding composition as in claim 8, wherein the free-radical polymerization initiator is activated by exposure to ultraviolet light, visible light or a temperature above 75° C.

10. A composition as in claim 8, wherein the particles of solid thermoplastic elastomer thickener have an average particle size in the range of 0.005 mm (5 microns) to 0.5 mm.

11. A composition as in claim 8, wherein the amount of solid thermoplastic elastomer thickener within the molding composition is at least 35 wt. %, based on the total weight of reactive liquid monomer, liquid oligomer, liquid polymer or combination thereof in said composition.

12. A composition of claim 8 wherein the solid thermoplastic elastomer thickener is an acrylic block copolymer.

13. A composition as in claim 12 wherein the acrylic block copolymer is a block copolymer of acrylate or methacrylate monomers.

14. A composition as in claim 13, wherein the reactive liquid monomer has vinyl unsaturation and is selected from the group consisting of acrylic acid monomers, methacrylic acid monomers, acrylate monomers, methacrylate monomers, vinyl ether monomers, acrylonitrile monomers, propylene monomers, vinyl acetate monomers, vinyl alcohol monomers, vinyl chloride monomers, styrene monomers vinylidine chloride monomers, butadiene monomers, isobutadiene monomers, isoprene monomers, divinyl benzene and mixtures thereof, and the reactive liquid oligomer has vinyl unsaturation and is selected from the group consisting of acrylic oligomers, methacrylic oligomers, styrene oligomers, vinyl ester oligomers, and polyester oligomers.

15. A composition as in claim 8 in the form of a bulk molding compound which additionally comprises at least 10 wt % of long fiber reinforcement which is insoluble in said solid thermoplastic elastomer thickener and has an aspect ratio (L/D) greater than 5:1 and an average length of at least 0.25 mm.

16. A composition as in claim 8 in the form of a sheet molding compound which additionally comprises at least 25 wt % of long fiber reinforcement which is insoluble in said solid thermoplastic elastomer thickener and has a length greater than 0.25 mm.

17. A composition as in claim 15 wherein said fiber reinforcement is selected from the group consisting of glass fibers, carbon fibers, metal fibers, rayon fibers, aramid fibers, and polyolefin fibers.

18. A composition as in claim 16, wherein said fiber reinforcement is selected from the group consisting of glass fibers, carbon fibers, metal fibers, rayon fibers, aramid fibers, and polyolefin fibers.

19. A composition as in claim 8, wherein at least 90% of said reactive liquid monomer, oligomer, polymer or combination thereof, is absorbed by said solid thermoplastic elastomer thickener.

20. A composition as in claim 8 which additionally comprises a solid resin, other than said solid thermoplastic elastomer thickener, which polymerizes in the presence of an activated free-radical polymerization initiator.

* * * * *